United States Patent
Cocchi et al.

(10) Patent No.: US 11,071,311 B2
(45) Date of Patent: Jul. 27, 2021

(54) MACHINE AND METHOD FOR MAKING LIQUID AND/OR SEMI-LIQUID FOOD PRODUCTS

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 519 days.

(21) Appl. No.: 14/290,045

(22) Filed: May 29, 2014

(65) Prior Publication Data
US 2014/0356494 A1    Dec. 4, 2014

(30) Foreign Application Priority Data
May 30, 2013    (IT) .......................... BO2013A000275

(51) Int. Cl.
| | |
|---|---|
| *A23G 9/28* | (2006.01) |
| *A23G 9/16* | (2006.01) |
| *A23G 9/04* | (2006.01) |
| *B65B 3/04* | (2006.01) |
| *B65B 31/04* | (2006.01) |

(52) U.S. Cl.
CPC .................. *A23G 9/28* (2013.01); *A23G 9/04* (2013.01); *A23G 9/166* (2013.01); *B65B 3/045* (2013.01); *B65B 31/044* (2013.01)

(58) Field of Classification Search
CPC . A23G 9/28; A23G 9/166; A23G 9/04; B65B 31/044; B65B 3/045
See application file for complete search history.

(56) References Cited

U.S. PATENT DOCUMENTS 5,229,150 A    7/1993    Ahnell et al.

FOREIGN PATENT DOCUMENTS

| EP | 2505070    | 10/2012 |
| EP | 2505070 A1 | 10/2012 |
| JP | H0787898 A | 4/1995  |

OTHER PUBLICATIONS

Italian Search Report dated Jan. 22, 2014 from counterpart app No. BO20130275.

(Continued)

*Primary Examiner* — Steven N Leff
(74) *Attorney, Agent, or Firm* — Shuttleworth & Ingersoll, PLC; Timothy J. Klima

(57) ABSTRACT

A method for making liquid and/or semi-liquid food products from liquid and/or semi-liquid base products comprising the steps of: preparing a container for supplying the base products, a container for processing the base products and a duct connecting the supplying container to the processing container and having at least one deformable portion; transferring the liquid base products through the connecting duct from the supplying container to the processing container; measuring a deformation value of said deformable portion of said connecting duct; controlling said supplying of the liquid base products through said connecting duct, from the supplying container to the processing container as a function of the measured value of deformation of the portion of the connecting duct.

17 Claims, 2 Drawing Sheets

(56) References Cited

OTHER PUBLICATIONS

English translation of Japanese Office Action dated Feb. 6, 2018 for counterpart Japanese Patent Application No. 2014-111352.
Chinese Office Action dated Sep. 29, 2018 from counterpart Chinese Patent Application No. 201410320101.7.
Chinese Office Action dated Jul. 5, 2019 from counterpart Chinese Patent Application No. 201410320101.7.

MACHINE AND METHOD FOR MAKING LIQUID AND/OR SEMI-LIQUID FOOD PRODUCTS

This application claims priority to Italian Patent Application BO20 A000275 filed May 30, 2013, the entirety of which is incorporated by reference herein.

BACKGROUND OF THE INVENTION

The present invention relates to a machine for making liquid and/or semi-liquid food products and a method for making liquid and/or semi-liquid food products.

In the sector in question, in particular in the ice cream industry, there are known machines comprising a receptacle for containing the liquid and/or semi-liquid base product, a tank or cylinder for processing the liquid and/or semi-liquid base product so as to produce the final liquid and/or semi-liquid product, and a thermal processing system coupled with the processing tank in order to cool/heat it.

These machines further comprise a pump, operatively interposed between the containing receptacle and the processing tank in order to draw base liquid from the receptacle and release it inside the tank.

As is well known, in order to obtain a product with certain characteristics and qualities it is necessary to keep the pressure inside the tank within a certain interval.

In the sector in question, in order to satisfy this need to maintain the pressure inside the tank within a certain interval, two different types of machines are known.

A first type of such machines comprises a pressure switch, operatively coupled to the tank so as to sense a pressure value inside the tank itself.

It should be observed that this pressure switch is directly in contact with the product being processed: therefore, the pressure switch must be made of certain types of material compatible with the foods it comes into contact with, in observance of industry regulations.

Moreover, the pressure switch is provided with a membrane that is particularly delicate and, as such, subject to frequent breakage.

Therefore, a poor reliability of the pressure switch is often complained of.

It should be observed that in this type of machine the pump is controlled based on the signal of the pressure switch, to enable regulation of the pressure inside the tank.

In accordance with a second type of machine, the pump is a gear pump, which is substantially driven on a continuous basis, and further comprises a recirculation duct between the pump outlet and inlet.

This recirculation duct is controlled by means of a mechanical device provided with an appropriately set spring.

The mechanical device causes the recirculation duct to open, enabling recirculation between the pump outlet and inlet if the pressure in the tank exceeds a desired set value, and causes the recirculation duct to close if the pressure in the tank falls below a desired set value.

There is a particularly felt need in the industry in question to provide machines for making liquid and/or semi-liquid food products that are particularly reliable and simple.

There is yet another need to provide machines for making liquid and/or semi-liquid food products that are capable of making liquid and/or semi-liquid food products having optimal quality.

SUMMARY OF THE INVENTION

The object of the present invention is to satisfy the above-mentioned needs by providing a machine and a method for making liquid and/or semi-liquid food products that are particularly reliable and simple.

Yet another object of the invention is to provide a machine and a method for making liquid and/or semi-liquid food products that enable a product of optimal quality to be produced.

In accordance with the invention, this object is achieved by a machine and a method for making liquid or semi-liquid products.

BRIEF DESCRIPTION OF THE DRAWINGS

The technical features of the invention, according to the aforesaid objects, are clearly inferable from the contents of the present disclosure, and the advantages of the same will be more apparent from the detailed description that follows, made with reference to the appended drawings which represent a purely illustrative, non-limiting embodiment thereof, in which.

DESCRIPTION OF THE PREFERRED EMBODIMENTS

Figure 1:
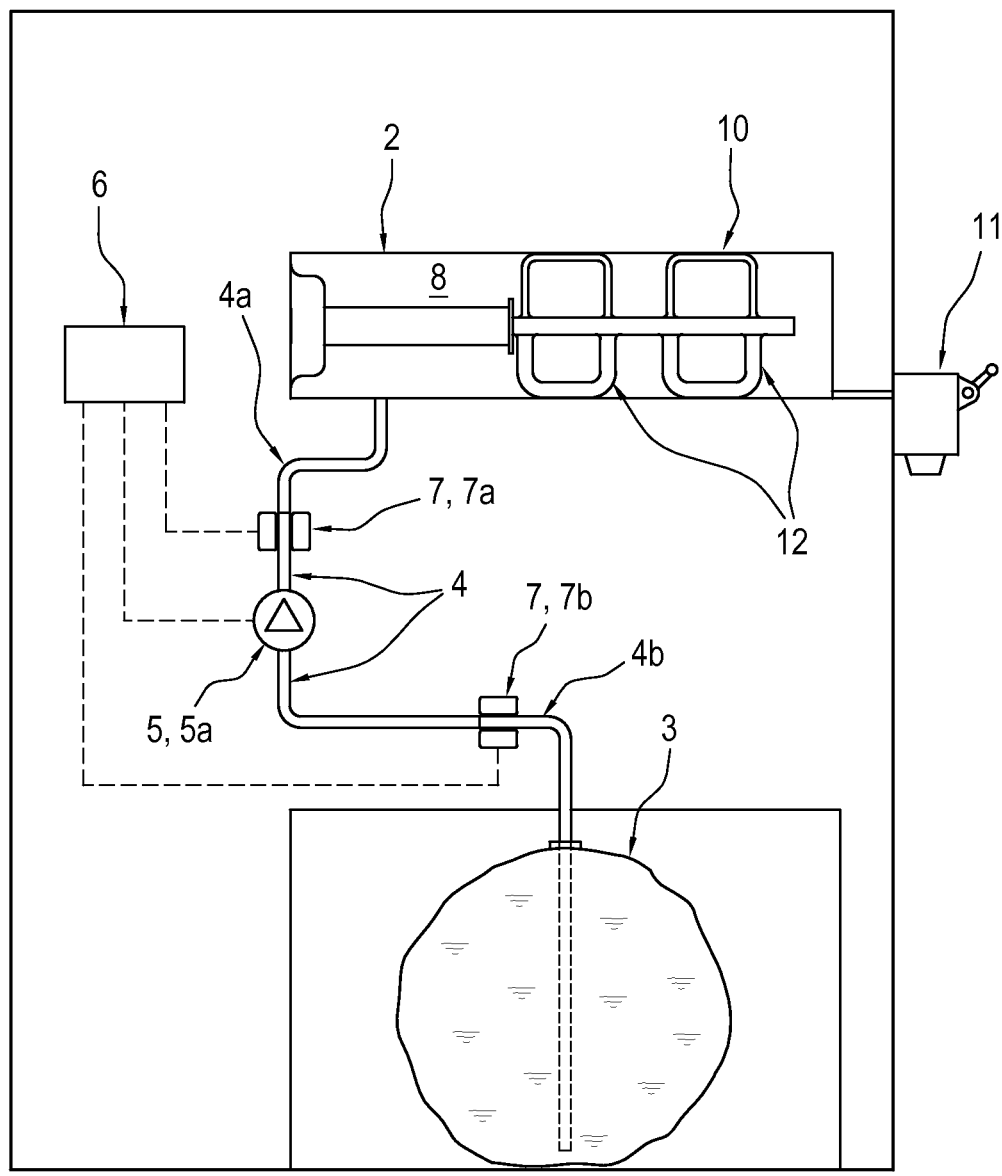
FIGS. 1 to 3 illustrate respective embodiments of a machine for making liquid or semi-liquid products of the present invention.

According to the invention, the numerical reference 1 indicates a machine for making and thermally processing liquid and/or semi-liquid food products starting from liquid and/or semi-liquid base products.

Preferably, the machine 1 is suitable for making ice cream.

Even more preferably, the machine 1 is suitable for making soft ice cream.

As is well known, soft ice cream is richer in fat content and contains less sugar than artisan-style ice cream, so its overrun is greater than 50%.

Moreover, given the lower sugar content, its dispensing temperature is $-4/-6°$ C.

The machine 1 according to the invention comprises:
a container (hereinafter also referred to as tank) 2 for processing the liquid and/or semi-liquid base products;
a thermal processing circuit operatively coupled to the processing container 2 to produce a heat exchange with the base product contained therein.

It should be observed that inside the processing container 2 the liquid and/or semi-liquid base products are transformed into the finished liquid and/or semi-liquid product (for example ice cream).

The machine 1 comprises a container 3 for supplying the liquid and/or semi-liquid base products.

The processing container 2 comprises a chamber 8 for processing the liquid and/or semi-liquid base product and which can be sealedly isolated from the outside atmosphere.

Preferably, the chamber 8 is a cylindrical chamber.

Furthermore, preferably, the thermal processing circuit comprises a refrigeration system.

In particular, the thermal processing circuit comprises a heat exchanger coupled with the processing container 2.

The processing container 2 is likewise provided with dispensing means 11, configured to enable the product to be drawn from the processing chamber 8.

It should be observed, moreover, that the machine 1 is preferably provided with mixing means 10, associated with the processing container 2 to enable a mixing of the base product inside the processing container 2.

Preferably, the mixing means 10 comprise a shaft and a plurality of mixing elements 12 fixed to the shaft.

Preferably, the mixing elements 12 are arranged in such a way as to scrape the surface of the processing container 2 or of the chamber 8.

According to a preferred embodiment, the mixing elements are configured to scrape the processing container 2 (preferably to scrape the inside surface).

Moreover, the shaft is driven in rotation by means of respective drive means (for example an electric motor).

Furthermore, the machine 1 comprises a duct 4 for connecting the container 3 with the processing container 2 to allow the passage of the liquid and/or semi-liquid base products from the container 3 to the processing container 2.

According to the invention, the connecting duct 4 comprises at least one deformable portion (4a,4b).

Preferably, the deformable portion (4a,4b) consists of a flexible tube.

Preferably, the flexible tube 4 is a rubber tube.

According to the invention, the machine 1 further comprises means 5 for transferring of the liquid base product from the supplying container 3 to the processing container 2, operating on the container 3 or on the duct 4 and configured to transfer the base product from the supplying container 3 to the processing container 2, through the connecting duct 4.

Figure 2:
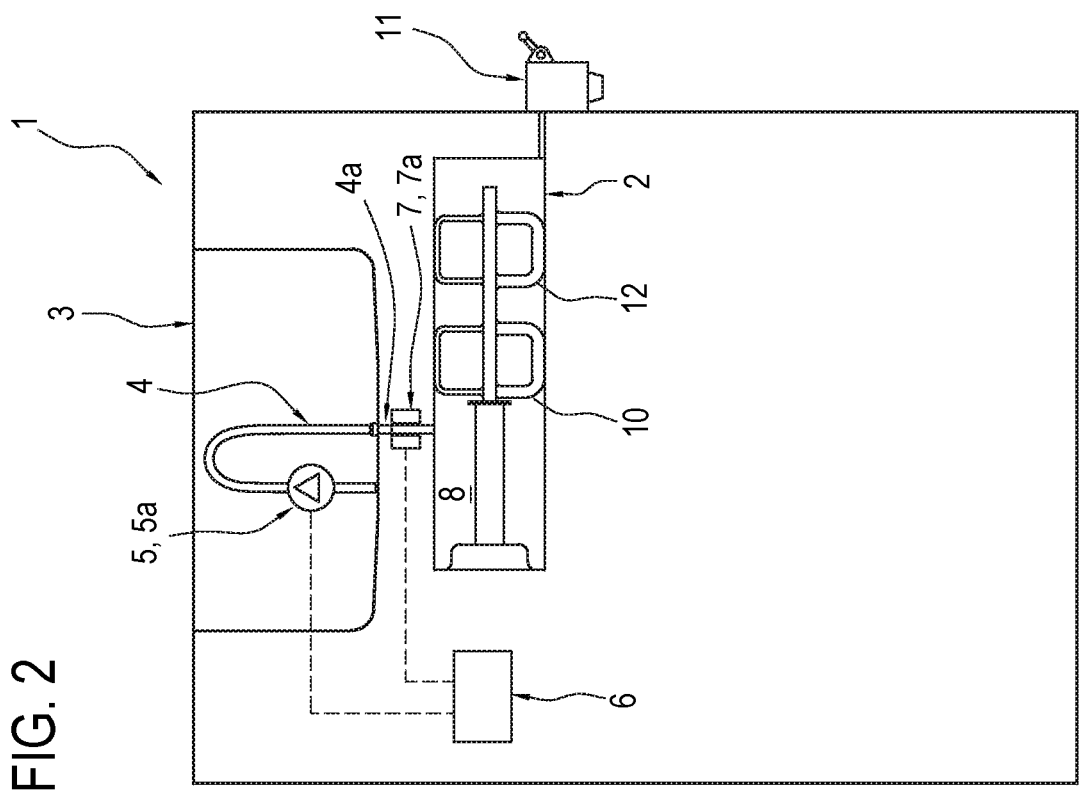

According to the embodiment illustrated in the FIGS. 1 and 2, the transfer means 5 comprise a pump 5a.

Preferably, the pump 5a is a peristaltic pump.

Figure 3:
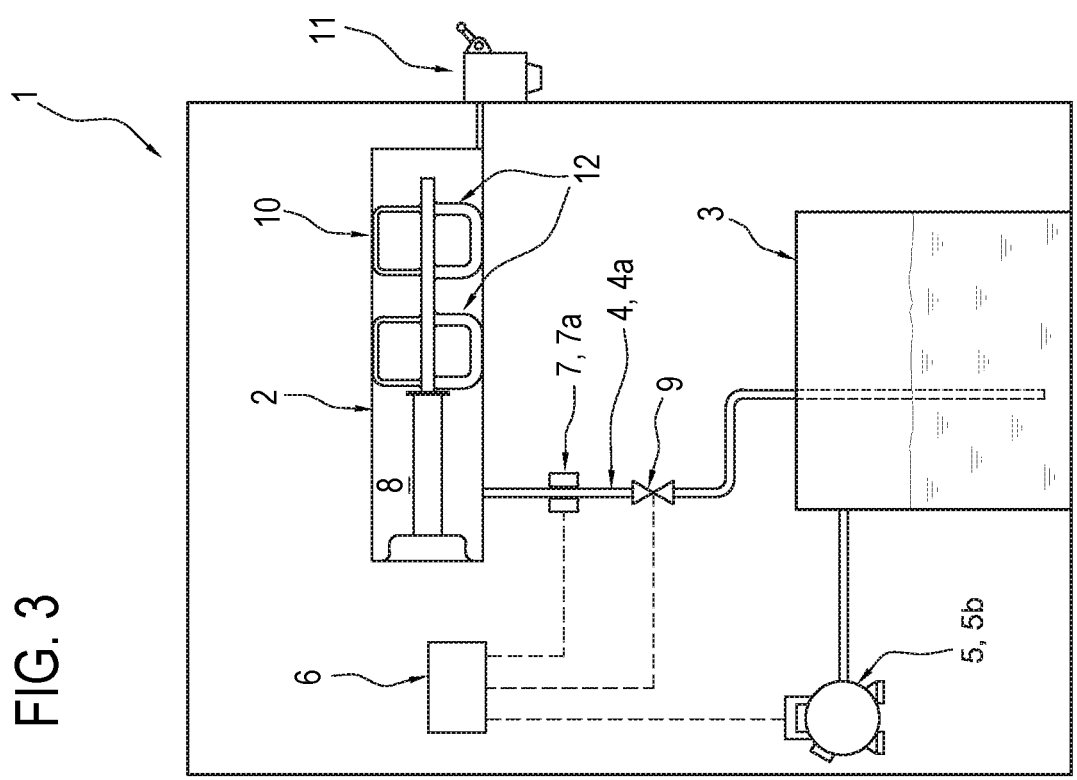

According to a variant illustrated in FIG. 3, the transfer means 5 comprise a compressor 5b, operatively connected to the container 3 so as to transfer compressed air into the container 3.

In this embodiment, the container 3 is preferably substantially rigid, i.e. of a non-deformable type.

Preferably, in this embodiment, the machine 1 comprises a valve 9 operatively coupled to the connecting duct 4 to enable a closure thereof controlled by the control unit 6.

It should be observed that the opening of the valve 9 causes the product to be transferred from the supplying container 3 to the processing container 2 through the connecting duct 4.

Therefore, in the variant illustrated in FIG. 3, the compressed air inside the container 3 allows the base products to be discharged from the container 3 and transferred to the processing container 2 via the connecting duct 4.

According to the invention, the machine 1 comprises a drive and control unit 6, operatively connected to the means 5 for transferring the liquid base product so as to control (enable) them in order to transfer the liquid base product from the container 3 to the processing container 2.

It should be observed that the drive and control unit 6 preferably comprises an electronic unit (which can be of the type integrated in a single processing unit or distributed over several boards).

The measuring means 7 are coupled to the deformable portion (4a,4b) of the connecting duct 4 to measure the deformation (preferably radial) of the portion (4a,4b).

It should be observed that the measuring means 7 comprise one or more sensors 7a.

Preferably, the measuring means 7 are coupled to the outside of the deformable portion (4a,4b) of the duct 4 to measure its deformation (preferably radial).

Even more preferably, the measuring means 7 are in contact with the outer surface of the deformable portion (4a,4b).

It should be observed that the measuring means 7 are preferably disposed in such a way as not to be in contact with the liquid and/or semi-liquid base products.

It should be observed more in general that the measuring means 7 are associated with the deformable portion (4a,4b) of the duct 4.

It should moreover be observed that the radial deformation of the deformable portion (4a,4b) of the duct 4 is a direct consequence of the pressure difference between the inside of the portion (4a,4b) and the outside of the portion (4a,4b).

In particular, if the pressure inside the portion (4a,4b) is greater than that outside the portion (4a,4b), the portion (4a,4b) will be deformed radially so that its outer diameter will increase.

Conversely, if the pressure inside the portion (4a,4b) is less than that outside the portion (4a,4b), the portion (4a,4b) will be deformed radially so that its outer diameter will decrease.

According to the invention, the drive and control unit 6 is connected to the measuring means 7 to receive the radial deformation signal relating to the deformable portion (4a, 4b) and is configured to control the transfer means 5 based on the deformation signal.

It should be observed that the drive and control unit 6 is configured to enable and disable the transfer means 5 based on the deformation signal, so as to control the transfer means 5.

A first embodiment of the invention is described below, purely by way of non-limiting example.

According to this first embodiment, the deformable portion 4a is in fluid communication with the processing container 2.

It should be observed, therefore, that the measuring means, according to this aspect, measure the deformation of a deformable portion 4a in direct fluid communication with the processing container 2.

In other words, according to this aspect, inside the deformable portion 4a there is substantially the same pressure as in the processing container 2.

Therefore, in the first embodiment, the deformation signal of the deformable portion 4a is correlated to the pressure inside the processing container 2, or chamber 8 (since the outside pressure is substantially unvaried during operation).

According to this first embodiment, the drive and control unit 6 is preferably configured to enable the transfer means 5 if the radial deformation is less than a predetermined value corresponding to a condition of low pressure in the processing container 2.

In practical terms, if the pressure in the processing container 2 is below a predetermined value, the quality of the ice cream being processed will not be optimal: therefore, the aforesaid configuration of the drive and control unit 6 causes the pressure in the processing container 2 to increase if it decreases excessively.

In fact, the activation of the transfer means 5 causes a further amount of base product to be transferred from the container 3 to the processing container 2, thereby increasing the pressure in the processing container 2.

Preferably, the condition of low pressure in the processing container 2 is associated with a value of pressure in the processing container 2 of less than 1.5 bar.

Moreover, the drive and control unit 6 is preferably configured to disable the transfer means 5 if the radial deformation is greater than a predetermined value, corresponding to a condition of high pressure in the processing container 2.

In other words, if the pressure in the processing container 2 is above a predetermined value, the quality of the ice cream being processed will not be optimal: therefore, the aforesaid configuration of the drive and control unit 6 causes the pressure in the processing container 2 to be decreased if it is excessive.

It should be observed that, according to what was described previously, the machine 1 enables the pressure inside the processing container 2 to be maintained within a predetermined interval in a particularly simple and reliable manner.

Moreover, the sensor is not in contact with the base product and is thus inexpensive and particularly simple.

Preferably, the condition of high pressure in the processing container 2 is associated with a pressure value in the processing container 2 greater than 2.5 bar.

With reference to FIG. 1, the container 3 is a deformable container, of the bag in box type.

FIG. 2 illustrates a variant of the machine according to FIG. 1 which envisages that the container 3 is mounted at the top of the machine, so as to be accessible from above.

The container 3 is therefore a receptacle that is open on the top to allow base products to be loaded.

In particular, according to the embodiment illustrated in FIG. 2, the container 3 has the form of an open tank.

Preferably, the container 3 is provided with stirring means (not illustrated).

Moreover, preferably, the pump 5a is housed inside the tank 3.

The pump inlet 5a is also preferably connected with the bottom of the container 3 and the pump outlet 5a is connected with the processing container 2 by means of the connecting duct 4.

FIG. 3 illustrates a further variant of the machine according to the first embodiment of the invention.

It should be observed that—preferably—according to this embodiment, the container 3 is a rigid container.

Preferably, according to this embodiment, the transfer means 5 comprise a compressor 5b, operatively connected to the container 3 so as to transfer compressed air into the container 3.

It should be observed, moreover, that according to this embodiment the compressor 5b feeds compressed air into the container 3.

Therefore, the transfer of liquid and/or semi-liquid base products comprises a step of feeding compressed air into the container 3, in such a way as to put the container 3 under pressure to allow the liquid base product to be transferred from the container 3 to the processing container 2 through the connecting duct 4 by means of the compressed air.

A further embodiment (called second embodiment) will now be described; here the deformable portion 4b is in fluid communication with the container 3 and the measuring means 7b are thus configured to measure a deformation correlated to the pressure inside the container 3.

It should be observed, in fact, that according to this embodiment, the deformable portion 4b is subjected internally to the pressure inside the container 3 and externally to the outside atmospheric pressure.

Therefore, the pressure of the container 3 acts radially from the inside on the portion 4b and the atmospheric pressure from the outside.

According to this aspect, the deformation of the deformable portion 4b is directly correlated to the internal pressure of the container 3, since the outside atmospheric pressure is substantially stable during the operation of the machine 1.

According to this embodiment, the container 3 is a deformable container of the bag in box type.

It should be observed, therefore, that the container 3 has a volume which is substantially dependent on the mass of liquid base product inside it.

It should be observed, moreover, that the pressure in the container 3 undergoes an abrupt decrease as a consequence of the container 3 being emptied.

Therefore, advantageously, the deformation signal of the measuring means 7b associated with the portion 4b in fluid communication with the container 3 is a signal correlated to the degree of filling of the container 3.

In particular, the deformation signal of the measuring means 7b associated with the portion 4a in fluid communication with the container 3 provides an indication as to an empty condition of the container 3, since the deformation value decreases abruptly (deformation in terms of a decrease in diameter) when the container 3 is empty.

In other words, when the container 3 is close to being emptied, if the pump 5a continues sucking, the container 3 will substantially collapse, bringing about an abrupt decrease in the pressure inside the container 3.

The decrease in the internal pressure of the container 3—the outside atmospheric pressure being equal—results in a deformation of the portion 4a of the duct 4, with a decrease in diameter.

In accordance with this second embodiment, the drive and control unit 6 is configured to disable the transfer means 5 if the deformation is greater than a predetermined value, corresponding to a condition of low pressure in the container 3.

In practical terms, the drive and control unit 6 disables the transfer means 5 if it detects a condition corresponding to a vacuum in the container 3, i.e. a low level in the amount of base material in the container 3.

A machine in accordance with this second embodiment advantageously enables the transfer means 5 to be stopped upon emptying of the container 3.

Advantageously, this enables the emptying of the container 3 to be monitored in a simple manner so as to avoid having an amount of base product in the processing container 2 that is not suitable for processing (situation that occurs in practice when the transfer means 5 are enabled with the container 3 empty).

Therefore, very briefly, the machine 1 in accordance with the second embodiment advantageously enables a product of optimal quality to be produced, since the emptying condition of the tank 3 is controlled.

Moreover, the fact that in the machine 1 in accordance with the second embodiment the transfer means 5 are disabled when the container 3 is empty prevents them from overheating or being damaged, thus increasing the reliability and life of the machine 1.

It should be observed that all of the features of the first and second embodiments can be combined together.

Also defined according to the invention is a method 1 for making liquid and/or semi-liquid food products (preferably ice cream, even more preferably ice cream of the soft type) from liquid and/or semi-liquid base products.

The method according to the invention comprises the steps of: preparing a container 3 for supplying the base products, a container 2 for processing the base products and a duct 4 connecting the container 3 to the processing container 2 and having at least one deformable portion 4a; transferring the liquid base products through the connecting duct 4 from the supplying container 3 to the processing container 2; measuring a value of radial deformation of the deformable portion 4a of the connecting duct 4; controlling the supplying of the liquid base products through the connecting duct 4 from the supplying container 3 to the processing container 2 based on the measured value of radial deformation of the portion 4a of the connecting duct 4; and thermally processing the base products in the processing container 2 to obtain the aforesaid liquid and/or semi-liquid food products.

Preferably, the step of controlling the supplying of the liquid base products comprises a step of enabling and disabling the supplying of the liquid base products.

Again according to a first embodiment of the method (FIGS. 1, 2 and 3), the step of measuring a value of radial deformation comprises a step of measuring a radial deformation of a portion 4a of the connecting duct 4 in fluid communication with the processing container 2.

It should be observed that, according to this first embodiment of the method, the fact that the portion 4a of the connecting duct 4 is in fluid communication with the processing container 2 ensures that the pressure inside the portion 4a is equal to the pressure in the processing container 2.

Moreover, according to another aspect, the step of controlling the supplying comprises a step of enabling the supplying if the radial deformation is less than a predetermined value corresponding to a condition of low pressure in the processing container 2.

It should be observed, moreover, that according to yet another aspect, the step of controlling the supplying comprises a step of disabling the supplying if the radial deformation is greater than a predetermined value corresponding to a condition of high pressure in the processing container 2.

According to an additional second embodiment of the invention, the step of measuring a degree of radial deformation comprises a step of measuring a radial deformation of a portion 4b of the connecting duct 4 in fluid communication with the container 3 (FIG. 1).

It should be observed that, according to this second embodiment of the method, the fact that the portion 4b of the connecting duct 4 is in fluid communication with the container 3 ensures that the pressure inside the portion 4b is equal to the pressure inside the container 3 (FIG. 1).

Preferably, the step of controlling the supplying comprises a step of disabling the supplying if the radial deformation—measured in a portion 4b of the connecting duct 4 in fluid communication with the container 3—is less than a predetermined value corresponding to a condition of low pressure in the container 3.

Preferably, the container 3 is a deformable container.

According to another aspect of the method of the invention, the aforesaid step of transferring said liquid and/or semi-liquid base products comprises a step of causing the liquid and/or semi-liquid base products to circulate by means of a pump 5a.

According to another aspect of the method of the invention, the aforesaid step of transferring the liquid and/or semi-liquid base products comprises a step of feeding compressed air into the container 3, in such a way as to put said container 3 under pressure to allow the liquid base product to be transferred from the container 3 to the processing container 2 by means of the compressed air.

It should be observed that the thermal processing step preferably comprises the steps of mixing said liquid and/or semi-liquid base products in said processing container 2 and cooling the liquid and/or semi-liquid base products to enable the production of ice cream.

Advantageously, the method according to the first embodiment serves to maintain the pressure inside the processing container 2 substantially within a desired interval in a particularly simple and reliable manner.

This means that it is possible to produce a finished product of optimal quality.

It should be observed that the method according to the first embodiment of the invention enables the pressure inside the processing container 2 to be substantially maintained within a predetermined interval in a fast, practical and simple manner thanks to a reading of a parameter (radial deformation) correlated to the pressure of the processing container 2.

It should be observed, moreover, that according to the method no contact with the product being processed is envisaged: this prevents any accidental contamination of the product and, moreover, avoids the use of sensors, thus increasing the overall reliability of the machine.

More in general, the method according to the invention makes it possible to increase the reliability of the machine and simultaneously obtain a product of optimal quality since, irrespective of the positioning of the measuring means 7 (in fluid communication with the processing container 2 and/or with the container 3), contact of the measuring means 7 with the product is avoided and thus the risk of any contamination of the product with grease, oil, etc. is substantially eliminated.

It should be observed that, as illustrated in FIG. 1, the method according to the first embodiment can be integrated with the method according to the second embodiment in a same machine 1.

With reference to the specific advantages of the method and of the machine according to the invention, it should be noted that the method proves to be particularly advantageous in the case of production of a product like ice cream (artisan-style ice cream or soft ice cream).

An ice cream product comprises a mixture of air, water, fat, various components present in milk, sweeteners, stabilizers, emulsifiers and flavorings.

Air is a fundamental component for making ice cream: in fact, the ice cream product is simultaneously an emulsion, a dispersion and a foam.

An ice cream product of optimal quality has a soft and creamy consistency, which is mostly determined by the distribution and size of the air particles dispersed in the product itself.

The air particles incorporated in the mixture have an optimal size of between 20 and 50 micrometers in diameter.

It has been observed that air is an important and fundamental component of an ice cream product, as it influences the physical and sensory properties of the ice cream itself, as well as its capability of being preserved.

Experimentally, it has been shown that about half if not more of an ice cream product is air, with overrun values that can vary from 25% to 150%.

It should be highlighted that, according to the invention, it has been found that controlling the pressure inside the processing container (processing cylinder or chamber) makes it possible to regulate the amount of air incorporated into the ice cream product.

In fact, the volume of the processing container (processing cylinder or chamber) is constant and substantially not modifiable: it is thus possible to regulate (vary) the air inside the processing container, that is, in the ice cream product being produced, by regulating the pressure of the processing container.

According to this aspect, there is provided a method for making ice cream products (artisan-style or soft ice cream) from liquid and/or semi-liquid base products characterized in that it comprises the steps of:

preparing a container 3 for supplying the base products, a container 2 for processing the base products and a duct 4 for connecting the supplying container 3 to the processing container 2 and having at least one deformable portion 4a;

transferring the liquid base products through the connecting duct 4 from the supplying container 3 to the processing container 2;

measuring a deformation value of the deformable portion (4a,4b) of the connecting duct 4;

controlling the supplying of the liquid base products through the connecting duct from the supplying container 3 to the processing container 2 based on the measured value of radial deformation of the portion (4a,4b) of the connecting duct 4 so as to regulate the pressure inside the supplying container 3 and control the overrun (percentage of air incorporated in the mixture) of the ice cream product being processed.

It should be observed, therefore, that the overrun (percentage of air incorporated in the mixture) of the ice cream product being processed is indirectly feedback-controlled based on the the signal of radial deformation of the portion (4a,4b) of the connecting duct 4.

In other words, it should be observed that the method comprises measuring a deformation value of said deformable portion (4a,4b) of said connecting duct 4 and controlling the supplying of the liquid base products based on the measured value so as to control the overrun (or percentage of product) of the product being processed.

Advantageously, according to this aspect, the process of making ice cream, in particular the incorporation of air, is controlled in a particularly precise and accurate manner, resulting in an ice cream product that is of optimal quality and particularly flavorful.

It has been experimentally observed that the method described enables the overrun of the product being processed to be controlled in a particularly simple and accurate manner, also in existing machines (by simply installing a pressure sensor on the deformable portion of the duct 4 and appropriately programming the control unit of the machine 1).

According to this aspect, the present invention concerns an ice cream machine capable of producing artisan-style ice cream and/or soft ice cream.

According to this aspect, it should be noted that the container 2 defines a batch freezing unit designed to enable a thermal processing with incorporation of air into the product being processed to obtain the production of an ice cream product.

The machine 1 thus comprises a control unit configured to control the supplying of the products based on the measured deformation signal of the deformable portion (4a,4b) and a predetermined time curve (memorized in the control unit or in an external device) of pressures to be maintained inside the processing container 3.

It should be observed, therefore, that the overrun of the ice cream product is controlled in a closed loop fashion, i.e. by feedback, based on the measured deformation signal of the deformable portion (4a,4b).

What is claimed is:

1. A method for making ice cream from at least one chosen from a liquid and a semi-liquid base product, comprising:

providing a supplying container for supplying the at least one chosen from the liquid and the semi-liquid base product, providing a processing container including an interior chamber for processing the at least one chosen from the liquid and the semi-liquid base product, providing a rotatable mixer inside the interior chamber for mixing the at least one chosen from the liquid and the semi-liquid base product, providing a deformable connecting duct having only a single product input attached to the supplying container for connecting the supplying container to the interior chamber in a closed manner, a first certain length of the deformable connecting duct being defined as a first measuring portion having an interior and an outer surface, wherein the interior of the first measuring portion of the deformable connecting duct is in fluid communication with the interior chamber such that a pressure inside the interior of the first measuring portion of the deformable connecting duct is equal at all times to a pressure inside the interior chamber, and the outer surface of the first measuring portion of the deformable connecting duct is exposed and subject to, at all times, an outside atmospheric pressure, the interior chamber including a cylindrical side wall and the deformable connecting duct being connected to the interior chamber through the cylindrical side wall;

using a transfer device to transfer the at least one chosen from the liquid and the semi-liquid base product through the deformable connecting duct, from the supplying container to the interior chamber and increasing the pressure in the interior chamber;

positioning the first measuring portion between the transfer device and the interior chamber;

using a first sensor in direct contact with the outer surface of the first measuring portion to measure a radial deformation value of the first measuring portion, the radial deformation of the first measuring portion being a direct consequence of a pressure difference between the pressure inside the first measuring portion and the outside atmospheric pressure outside the first measuring portion;

providing that the deformable connecting duct includes a second certain length of the deformable connecting duct being defined as a second measuring portion having an interior and an outer surface, wherein the interior of the second measuring portion of the deformable connecting duct is in fluid communication with the supplying container such that a pressure inside the interior of the second measuring portion of the deformable connecting duct is equal at all times to a pressure inside the supplying container, and the outer surface of the second measuring portion of the deformable connecting duct is exposed and subject to, at all times, the outside atmospheric pressure;

using a second sensor in direct contact with the outer surface of the second measuring portion to measure a radial deformation value of the second measuring portion, the radial deformation of the second measuring portion being a direct consequence of a pressure difference between the pressure inside the second measuring portion and the outside atmospheric pressure outside the second measuring portion;

controlling the transfer of the at least one chosen from the liquid and the semi-liquid base product through the deformable connecting duct from the supplying container to the interior chamber and also controlling the pressure in the interior chamber by controlling the transfer device as a function of the radial deformation value to indirectly feedback control overrun of the ice cream based on the pressure in the interior chamber as measured at the first measuring portion;

thermally processing the at least one chosen from the liquid and the semi-liquid base product by mixing and cooling the at least one chosen from the liquid and the semi-liquid base product in the interior chamber to produce the ice cream;

wherein the controlling the transfer of the at least one chosen from the liquid and the semi-liquid base product comprises disabling the transfer if the radial deformation, measured on the second measuring portion is greater than a predetermined value, corresponding to a condition of low pressure in the supplying container, wherein the radial deformation value measured on the second measuring portion greater than the predetermined value corresponds to a decrease in a diameter of the second measuring portion;

wherein the controlling the transfer and the pressure in the interior chamber is based on comparison of the radial deformation value of the first measuring portion and on a predetermined memorized time curve of pressure to be maintained in the interior chamber;

providing that the supplying container is a deformable container;

providing that at least the first measuring portion of the deformable connecting duct is a rubber tube.

2. The method according to claim 1, and further comprising thermally processing the at least one chosen from the liquid and the semi-liquid base product in the interior chamber to obtain the ice cream.

3. The method according to claim 1, wherein the controlling the transfer of the at least one chosen from the liquid and the semi-liquid base product comprises enabling the transfer of the at least one chosen from the liquid and the semi-liquid base product.

4. The method according to claim 1, wherein the controlling the transfer of the at least one chosen from the liquid and the semi-liquid base product comprises enabling the transfer if the radial deformation of the first measuring portion is less than a predetermined value, corresponding to a condition of low pressure in the interior chamber.

5. The method according to claim 1, wherein the controlling the transfer of the at least one chosen from the liquid and the semi-liquid base product comprises disabling the transfer if the radial deformation of the first measuring portion is greater than a predetermined value, corresponding to a condition of high pressure in the interior chamber.

6. The method according to claim 1, wherein the supplying container is a deformable container.

7. The method according to claim 1, wherein the transferring the at least one chosen from the liquid and the semi-liquid base product through the connecting duct comprises circulating the at least one chosen from the liquid and the semi-liquid base product with a peristaltic pump acting on an outer surface of the deformable connecting duct.

8. The method according to claim 1, wherein the transferring the at least one chosen from the liquid and the semi-liquid base product through the connecting duct comprises feeding compressed air into the supplying container, to put the supplying container under pressure to allow the at least one chosen from the liquid and the semi-liquid base product to be transferred from the supplying container to the interior chamber by the compressed air.

9. An ice cream machine for making and thermally processing ice cream from at least one chosen from a liquid and a semi-liquid base product, comprising:

a processing container including an interior chamber for processing the at least one chosen from the liquid and the semi-liquid base product;

a rotatable mixer positioned inside the interior chamber for mixing the at least one chosen from the liquid and the semi-liquid base product, a thermal processing circuit operatively coupled to the processing container to produce a heat exchange with the at least one chosen from the liquid and the semi-liquid base product contained in the interior chamber;

a deformable supplying container for supplying the at least one chosen from the liquid and the semi-liquid base product;

a deformable connecting duct having only a single product input attached to the supplying container connecting the supplying container with the interior chamber in a closed manner to allow passage of the at least one chosen from the liquid and the semi-liquid base product from the supplying container to the interior chamber, a first certain length of the deformable connecting duct being defined as a first measuring portion having an interior and an outer surface;

a transfer device for transferring the at least one chosen from the liquid and the semi-liquid base product from the supplying container to the interior chamber, operating on at least one chosen from the supplying container and the connecting duct and configured to transfer the at least one chosen from the liquid and the semi-liquid base product from the supplying container to the interior chamber through the connecting duct and to increase pressure in the interior chamber;

the first measuring portion being positioned between the transfer device and the interior chamber;

a drive and control unit operatively connected to the transfer device to control the transfer device to transfer the at least one chosen from the liquid and the semi-liquid base product from the supplying container to the interior chamber, wherein the deformable connecting duct includes a measuring portion having an interior and an outer surface;

wherein the interior of the first measuring portion of the deformable connecting duct is in fluid communication with the interior chamber such that a pressure inside the interior of the first measuring portion of the deformable connecting duct is equal at all times to a pressure inside the interior chamber, and the outer surface of the first measuring portion of the deformable connecting duct is exposed and subject to, at all times, an outside atmospheric pressure, the interior chamber including a cylindrical side wall and the deformable connecting duct being connected to the interior chamber through the cylindrical side wall;

a first measuring device, coupled to the first measuring portion to measure a radial deformation of the first measuring portion, the first measuring device including a first sensor in direct contact with the outer surface of the first measuring portion to measure the radial deformation of the first measuring portion, the radial deformation of the first measuring portion being a direct consequence of a pressure difference between the pressure inside the first measuring portion and the outside atmospheric pressure outside the first measuring portion;

wherein the deformable connecting duct includes a second certain length of the deformable connecting duct as a second measuring portion having an interior and an outer surface, wherein the interior of the second measuring portion of the deformable connecting duct is in fluid communication with the supplying container such that a pressure inside the interior of the second measuring portion of the deformable connecting duct is equal at all times to a pressure inside the supplying container, and the outer surface of the second measuring portion of the deformable connecting duct is exposed and subject to, at all times, the outside atmospheric pressure;

a second measuring device, coupled to the second measuring portion to measure a radial deformation of the second measuring portion, the second measuring device including a second sensor in direct contact with the outer surface of the second measuring portion to measure a radial deformation value of the second measuring portion, the radial deformation of the second measuring portion being a direct consequence of a pressure difference between the pressure inside the second measuring portion and the outside atmospheric pressure outside the second measuring portion;

wherein the drive and control unit is connected to the first measuring device to receive a first radial deformation signal from the first measuring device relating to the radial deformation of the first measuring device and is programmed and configured to control the transfer device to transfer the at least one chosen from the liquid and the semi-liquid base product through the connecting duct and also control the pressure in the interior chamber by controlling the transfer device as a function of the first radial deformation signal to indirectly feedback control overrun of the ice cream based on the pressure in the interior chamber as measured at the first measuring portion;

wherein the drive and control unit is connected to the second measuring device to receive a second radial deformation signal from the second measuring device relating to the radial deformation of the second measuring device and is programmed and configured to control the transfer device in transferring the at least one chosen from the liquid and the semi-liquid base product and disabling the transferring if the radial deformation measured on the second measuring portion is greater than a predetermined value, corresponding to a condition of low pressure in the supplying container, wherein the radial deformation value measured on the second measuring portion greater than the predetermined value corresponds to a decrease in a diameter of the second measuring portion;

wherein the controlling the transfer and the pressure in the interior chamber is based on comparison of a value of the first radial deformation signal and on a predetermined memorized time curve of pressure to be maintained inside the interior chamber;

wherein at least the first measuring portion of the deformable connecting duct is a rubber tube.

10. The machine according to claim 9, wherein the interior chamber is configured to be sealingly isolated from an outside atmosphere.

11. The machine according to claim 9, wherein the drive and control unit is configured to enable the transfer device if the radial deformation of the first measuring portion is less than a predetermined value, corresponding to a condition of low pressure in the interior chamber.

12. The machine according to claim 9, wherein the drive and control unit is configured to disable the transfer device if the radial deformation of the first measuring portion is greater than a predetermined value, corresponding to a condition of high pressure in the interior chamber.

13. The machine according to claim 9, wherein the supplying container is a bag in box deformable container.

14. The machine according to claim 9, wherein the drive and control unit is configured to disable the transfer device if the radial deformation of the second measuring portion is less than a predetermined value, corresponding to a condition of low pressure in the supplying container.

15. The machine according to claim 9, wherein the supplying container is mounted at a top of the machine, to be accessible from above.

16. The machine according to claim 9, wherein the transfer device includes a peristaltic pump acting on an outer surface of the deformable connecting duct.

17. The machine according to claim 9, wherein the transfer device includes a compressor, operatively connected to the supplying container to transfer compressed air into the supplying container.

* * * * *